(12) United States Patent
Chang

(10) Patent No.: US 6,901,268 B2
(45) Date of Patent: May 31, 2005

(54) METHOD OF SUPPORTING POWER CONTROL ON SUPPLEMENTAL CHANNEL IN BASE STATION

(75) Inventor: Yong Chang, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 654 days.

(21) Appl. No.: 09/843,790

(22) Filed: Apr. 27, 2001

(65) Prior Publication Data

US 2001/0046878 A1 Nov. 29, 2001

(30) Foreign Application Priority Data

Apr. 27, 2000 (KR) ........................................ 2000-23372

(51) Int. Cl.⁷ ................................................ H04B 1/00
(52) U.S. Cl. ....................... 455/522; 455/69; 455/572; 455/422
(58) Field of Search ..................... 455/69, 522, 442, 455/572, 422, 440, 443, 68, 88, 455, 67.1; 370/335, 318, 331

(56) References Cited

U.S. PATENT DOCUMENTS

| | | | | |
|---|---|---|---|---|
| 5,884,187 A | * | 3/1999 | Ziv et al. ..................... | 455/522 |
| 5,982,760 A | | 11/1999 | Chen | |
| 5,987,326 A | * | 11/1999 | Tiedemann et al. ......... | 455/442 |
| 6,070,086 A | * | 5/2000 | Dobrica ...................... | 455/522 |
| 6,092,230 A | * | 7/2000 | Wood et al. ................ | 714/755 |
| 6,148,208 A | * | 11/2000 | Love .......................... | 455/442 |
| 6,330,462 B1 | * | 12/2001 | Chen .......................... | 455/572 |
| 6,377,809 B1 | * | 4/2002 | Rezaiifar et al. ........... | 455/455 |
| 6,442,393 B1 | * | 8/2002 | Hogan ...................... | 455/456.5 |
| 6,512,750 B1 | * | 1/2003 | Palenius ..................... | 370/318 |

FOREIGN PATENT DOCUMENTS

| | | |
|---|---|---|
| WO | WO 98/36508 | 8/1998 |
| WO | WO01/61884 | 8/2001 |

OTHER PUBLICATIONS

European Search Report dated May 12, 2003, issued in a counterpart application, namely, Appln. No. 01932328.6.
"Physical Layer Standard for CDMA2000 Spread Spectrum Systems, Version 1.0," Jul. 1, 1999.
Supplementary European Search Report dated Mar. 5, 2004 issued in a counterpart application, namely, Appln. No. 01932328.6.

* cited by examiner

Primary Examiner—Nick Corsaro
Assistant Examiner—Tan Trinh
(74) Attorney, Agent, or Firm—Dilworth & Barrese LLP

(57) ABSTRACT

There is provided a method of transmitting power control information to a BSC (Base Station Controller) in a BTS (Base station Transitive System) of a mobile communication system. The BTS receives forward power control (FPC) mode information indicating a slow power control from the BSC and transmits the FPC mode information to an MS (Mobile Station). The BATS extracts an EIB (Erasure Indicator Bit) that is a power control command in a frame period from a reverse pilot channel received from the MS according to the FPC mode information, determines the status of the EIB, and transmits a reverse SCH (Supplemental Channel) message including the EIB status information to the BSC.

12 Claims, 19 Drawing Sheets

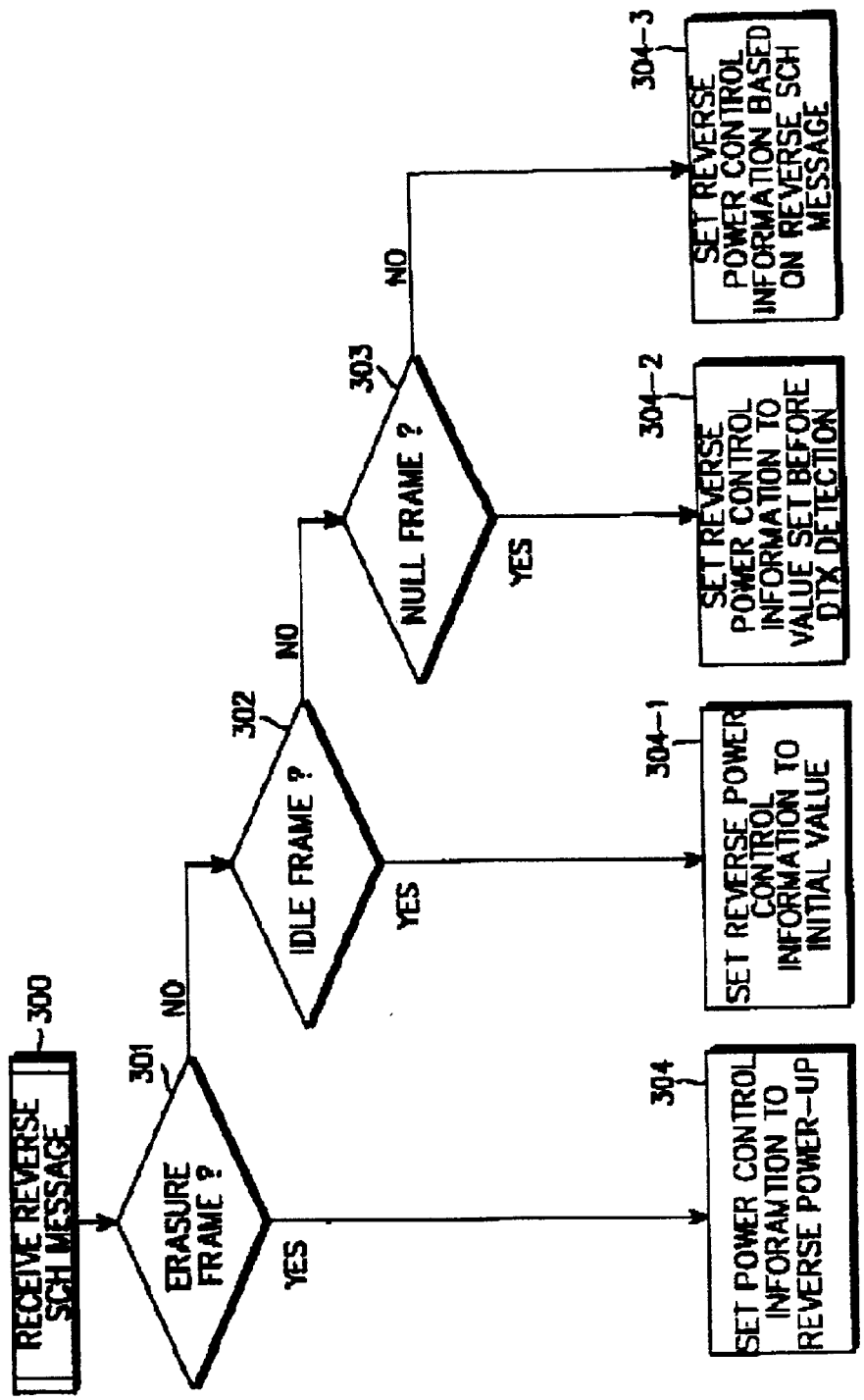

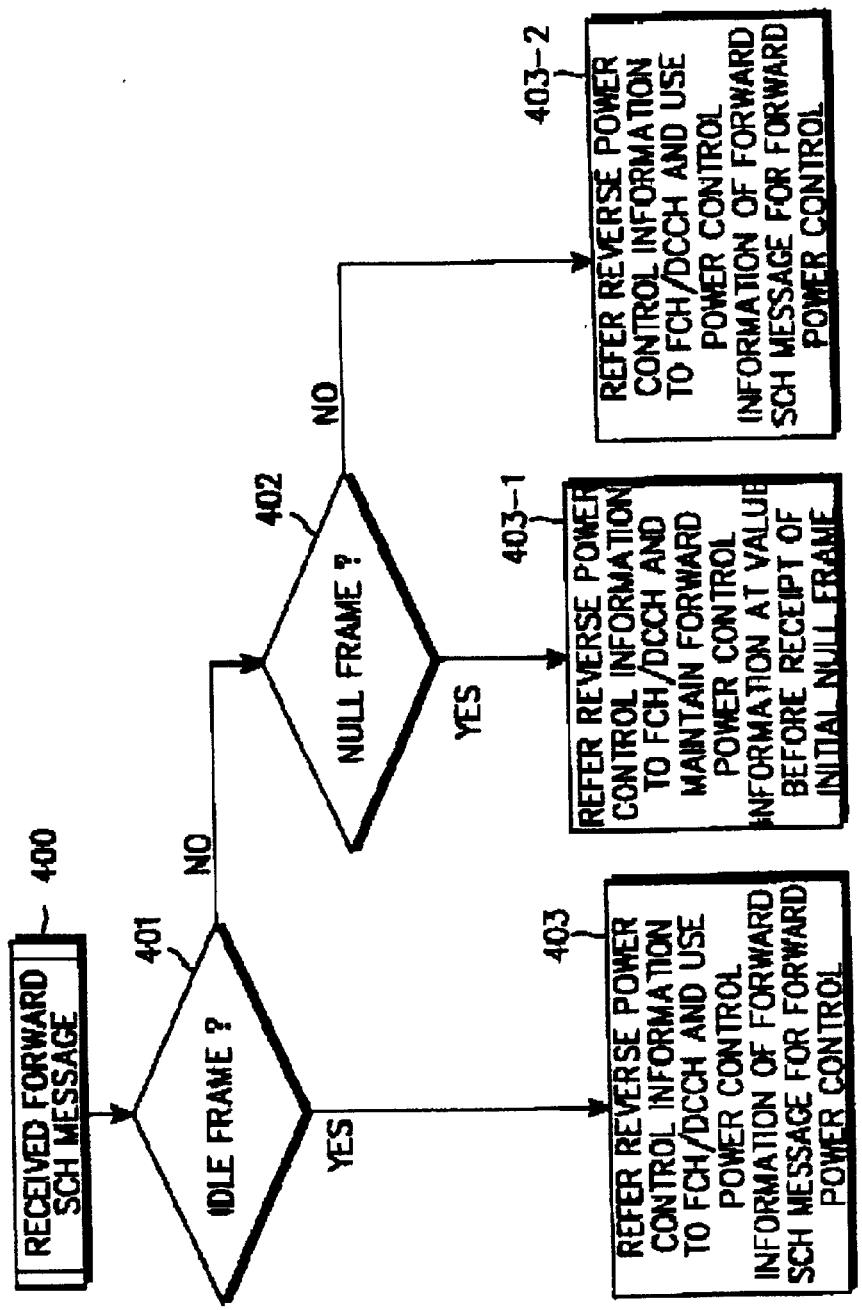

FIG. 7

| INFORMATION ELEMENT | ELEMENT DIRECTION | TYPE |
|---|---|---|
| MESSAGE TYPE II | SDU → BTS | M |
| FORWARD LAYER 3 IS-2000 FCH/SCH DATA | SDU → BTS | M |
| MESSAGE CRC | SDU → BTS | M |

FIG. 8

| 7 | 6 | 5 | 4 | 3 | 2 | 1 | 0 | Octet |
|---|---|---|---|---|---|---|---|---|
| MESSAGE TYPE II = [0EH] ||||||||  1 |
| FORWARD LAYER 3 IS-2000 FCH/SCH DATA {1: |||||||||
| FPC: SLC = [0001 TO 0110] |||| FSN = [0000 TO 1111] |||| 1 |
| FPC: GR = [00H – FFH] |||||||| 2 |
| IS-2000 FRAME CONTENT = [00H, 32H–39H, 3D–43H, 7FH] |||||||| 3 |
|  |||||||| 4 |
| (MSB) |||||||| 5 |
|  |||||||||
|  |||||||||
| (LSB) |||||||| n |
| } FORWARD LAYER 3 IS-2000 SCH DATA |||||||||
| (MSB) MESSAGE CRC = [0000H–FFFFH] |||||||| 1 |
| (LSB) |||||||| 2 |

FIG. 9

| INFORMATION ELEMENT | ELEMENT DIRECTION | TYPE |
|---|---|---|
| MESSAGE TYPE | SDU ← BTS | M |
| REVERSE LAYER 3 IS-2000 SCH DATA | SDU ← BTS | M |
| MESSAGE CRC | SDU ← BTS | M |

FIG. 10

| 7 | 6 | 5 | 4 | 3 | 2 | 1 | 0 | Octet |
|---|---|---|---|---|---|---|---|---|
| MESSAGE TYPE II = [11H] | | | | | | | | 1 |
| REVERSE LAYER 3 IS-2000 SCH DATA {1: | | | | | | | | |
| SOFT HANDOFF LEG # = [0000 – 1111] | | | | FSN = [ 0000 to 1111] | | | | 1 |
| CRC = [0,1] | SCALING = [00 11] | | REVERSE LINK QUALITY = [000 0000 111 1111] | | | | | 2 |
| PACKET ARRIVAL TIME ERROR = [00 0000 11 1111] | | | | | | | | 3 |
| IS-2000 FRAME CONTENT = [00H, 32H, 39H, 3DH, 43H, 7EH, 7FH] | | | | | | | | 5 |
| (MSB) | | | | | | | | 6 |
| REVERSE LINK INFORMATION = <VARIABLE> | | | | | | | | |
| | | | | | | | (LSB) | n |
| } REVERSE LAYER 3 IS-2000 SCH DATA | | | | | | | | |
| (MSB) | | | | | | | | 1 |
| MESSAGE CRC = [0000H–FFFFH] | | | | | | | | |
| | | | | | | | (LSB) | 2 |

FIG. 12

| INFORMATION ELEMENT | ELEMENT DIRECTION | TYPE |
|---|---|---|
| MESSAGE TYPE II | SDU → BTS | M |
| REVERSE LAYER 3 IS-2000 FCH/SCH DATA | SDU → BTS | M |
| MESSAGE CRC | SDU → BTS | M |

FIG. 13

| 7 | 6 | 5 | 4 | 3 | 2 | 1 | 0 | Octet |
|---|---|---|---|---|---|---|---|---|
| MESSAGE TYPE II = [0EH] ||||||||1|
| REVERSE LAYER 3 IS-2000 FCH/SCH DATA {||||||||
| SOFT HANDOFF LEG # = [0000 – 1111] |||| FSN = [0000 to 1111] ||||1|
| FQI = [0,1] | SCALING = [00 11] || REVERSE LINK QUALITY = [000 0000 111 1111] |||||2|
| PACKET ARRIVAL TIME ERROR = [00 0000 11 1111] ||||||||3|
| RESERVED ||||||| =[0,1] EIB | 5 |
| IS-2000 FRAME CONTENT = [00H, 32H, 39H, 3DH, 43H, 7EH, 7FH] ||||||||4|
| REVERSE LINK INFORMATION = <VARIABLE> ||||||||  |
| (MSB) ||||||| (LSB) | n |
| } REVERSE LAYER 3 IS-2000 SCH DATA ||||||||1|
| MESSAGE CRC = [0000H–FFFFH] ||||||||  |
| (MSB) ||||||| (LSB) | 2 |

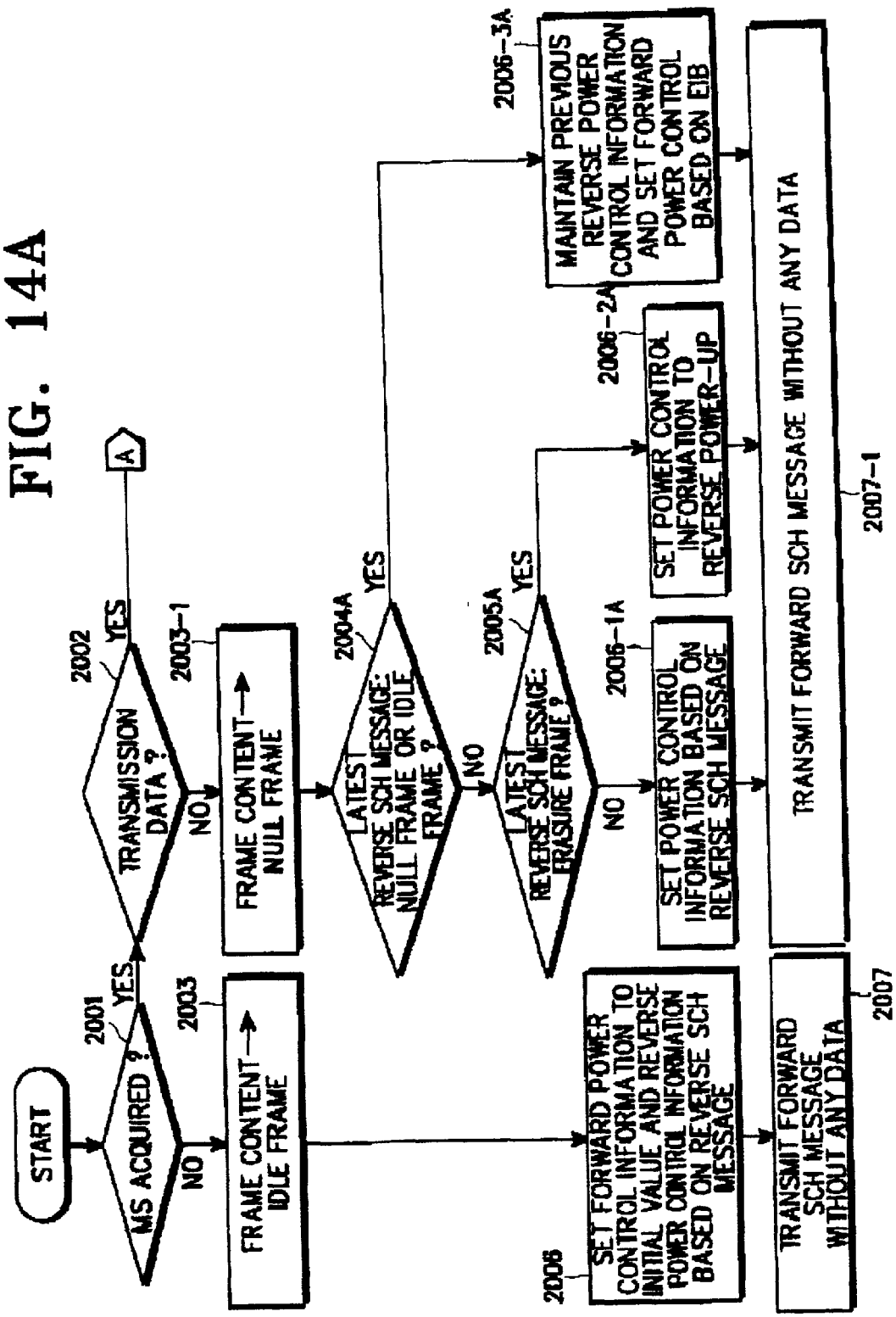

METHOD OF SUPPORTING POWER CONTROL ON SUPPLEMENTAL CHANNEL IN BASE STATION

PRIORITY

This application claims priority to an application entitled "Method of Supporting Power Control on SUCH in BS" filed in the Korean Industrial Property Office on Apr. 27, 2000 and assigned Ser. No. 2000-23372, the contents of which are hereby incorporated by reference.

BACKGROUND OF THE INVENTION

1. Field of the Invention

The present invention relates generally to a CDMA (Code Division Multiple Access) mobile communication system, and in particular, to an apparatus and method for supporting slow forward power control on an SCH (Supplemental Channel) for transmitting a large amount of data in a BTS (Base station Transceiver System) and a BSC (Base Station Controller).

2. Description of the Related Art

A discontinuous transmission (DTX) mode refers to a mode in which data is transmitted in frames only when transmission data is generated in a wired system or a mobile communication system. Data transmission in the DTX mode minimizes transmission power and increases the whole system capacity due to the decrease of interference with the system.

The DTX mode, however, exhibits a problem when a receiver cannot determine whether frames have been transmitted or not due to the irregular transmission of frames from a transmitter. This makes it impossible for a BTS to perform a forward power control. More specifically, when a receiver in a mobile station (MS) cannot make a proper determination about data transmission, it cannot rely on decoder decision parameters including CRC (Cyclic Redundancy Code) and decoding results. Hence, there is no known method for controlling the transmission power of the MS accurately in a discontinuous Transmission (DTX) mode.

Both a DCCH (Dedicated Control Channel) and an SCH support the DTX mode. The DCCH is characterized by data transmission only when transmission data is generated in an upper layer, which makes the DCCH suitable as a control channel for efficient packet services. The DCCH is supposed to transmit null frames for power control during the DTX period. The SCH supports a DTX mode in which no data is transmitted in the absence of transmission data. The SCH transmits no frames during the DTX period.

FIG. 1 is a block diagram of a typical mobile communication system. The mobile communication system depicted in FIG. 1 is a reference model of 3G IOS (Interoperability Specifications) with an MSC (Mobile Switching Center), BSs (Base Stations), and a digital air interface between the BSs, which are well known.

Referring to FIG. 1, an interface A1 is defined for signaling and an interface A2/A5 (exclusively for circuit data) for user traffic between an MSC 20 and a BSC 32. An interface A3 is defined to connect a target BS 40 to an SDU (Frame Selection/Distribution Unit Function) 34 of a source BS 30 to implement a soft/softer handoff.

Signaling messages and user data are transmitted between the target BS 40 and the SDU 34 of the source system 30 by the interface A3. An interface A7 is defined for signal transmission/reception between the target BS 40 and the source BS 30 for inter-BS soft/softer handoff. The wired communication lines of this CDMA mobile communication system include a forward link directed from the MSC 20 to the BS 30, a reverse link directed from the BS 30 to the MSC 20, and a line between the BSs 30 and 40. The MSC 20 includes a call control and mobility management block 22 and a switching block 24. The MSC 20 is connected to a data network (not shown) such as the Internet through an IWF (InterWorking Function) 50. Interfaces A8 and A9 are defined for user traffic and signaling, respectively, between a BS and a PCF (Packet Control Function) 60, and interfaces A10 and A11, for user traffic and signaling, respectively, between the PCF 60 and a PDSN (Packet Data Serving Node) 70.

FIG. 2 is a diagram showing an SCH signal flow between a BTS and a BSC (BSC-SDU) in a conventional technology. This operation may occur between a BSC 32 (BSC-SDU 34) and a BTS 36 in the source BS 30 or a BSC 42 and a BTS 44 in the target BS 40.

Referring to FIG. 2, the BTS determines the type of a frame to transmit to the BSC and generates a reverse SCH message in step 11. The reverse SCH message is supposed to be transmitted to the BSC in every predetermined period (e.g. 20 ms) in response to a reverse SCH frame received in the predetermined period from an MS (not shown). Step 11 will be described later in more detail referring to FIGS. 3A and 3B. In step 12, the BTS transmits the reverse SCH message to the BSC. The reverse SCH message may contain a data/null/idle/erasure frame. The BSC receives and processes the reverse SCH message and generates a forward SCH message in step 13. Reception of the reverse SCH message will be described later in more detail referring to FIG. 5. Processing the reverse SCH message and generation of the forward SCH message will be described in further detail referring to FIGS. 4A and 4B. In step 14, the BSC transmits the forward SCH message to the BTS. The forward SCH message may contain a data/null/idle frame. The BTS performs a forward/reverse power control for the MS based on power control information included in the forward SCH message in step 15. Reception of the forward SCH message will later be described in more detail referring to FIG. 6.

To summarize the operation shown in FIG. 2, after receiving a data frame in every predetermined period (20 ms) from the MS, the BTS generates a reverse SCH message in the predetermined period and transmits it to the BSC. The BSC processes the reverse SCH message, generates a forward SCH message, and transmits it to the BTS. Then, the BTS performs a power control for the MS based on power control information included in the forward SCH message.

FIG. 3 is a flowchart illustrating a conventional reverse SCH message transmitting operation. In this operation, the BTS transmits a frame received in the predetermined period from the MS as a reverse SCH message to the BSC-SDU. The following description is conducted with the appreciation that a forward/reverse SCH message is constructed in the same format as an FCH (Fundamental channel) shown in FIGS. 7 to 10.

Referring to FIG. 3, the BTS determines whether it has secured radio resources related with the MS and acquired the MS in step 101. If it has not, the BTS considers that it is not being synchronized with the MS and sets Frame Content in an IS-2000 reverse SCH message shown in FIG. 10 to an idle frame to synchronize with the BSC-SDU in step 104. Since the BTS is being synchronized with the BSC-SDU, the BTS sets power control information (Frame Quality Indicator, FQI and Reverse Link Quality) to negligible values in the reverse SCH message that will be transmitted to the BSC-SDU in step 105. For example, FQI in the reverse SCH message is set to 0 and Reverse Link Quality to 0000000. In step 106, the BTS transmits the IS-2000 reverse SCH message to the BSC-SDU.

On the other hand, if the BTS has secured the radio resources related with the MS and acquired the MS in step 101, it checks the quality of a frame received from the MS in step 102. If the data frame is bad, the BTS sets Frame Content of the reverse SCH message to an erasure frame in step 104-1. In step 105-1, the BTS sets the power control information of the reverse SCH message to negligible values. For example, FQI in the reverse SCH message is set to 0 and Reverse Link Quality to 0000000. In step 106-1 the BTS transmits the IS-2000 reverse SCH message without any data to the BSC-SDU since the received frame is bad. Upon recognition of the erasure frame, the BSC-SDU requests the MS to increase its transmission power regarding reverse power control. That is, since the data frame received from the MS is bad, the BSC-SDU will request the MS to transmit a data frame with incremented power.

If the BTS determines that the received frame is good in step 102, it determines whether it detects a DTX mode during reception of a reverse SCH frame from the MS by a known DTX mode detection method applied to a radio transmission period between an MS and a BTS in step 103. If the DTX mode is detected, the BTS goes to step 104-3, and otherwise, it goes to step 104-2.

In step 104-2, the BTS sets Frame Content of the reverse SCH message to a data frame and in step 106-2, it sets power control information of the reverse SCH message based on the SCH frame received from the MS. In the case of forward power control, the BTS extracts PCBs (Power Control Bits) from a reverse pilot channel and performs an inner fast power control only when FPC_MODE=001 or 010 in the reverse SCH message shown in FIG. 10. In step 106-2, the BTS transmits the IS-2000 reverse SCH message with the data of the 20-ms data frame received from the MS encapsulated to the BSC-SDU.

Upon detection of a DTX mode in step 103, the BTS sets Frame Content of the reverse SCH message to a null frame in step 104-3. In step 105-3, the BTS sets FQI to 0 and Reverse Link Quality to the reception strength (Ec/Io) of the reverse pilot channel in the reverse SCH message. That is, if the reverse SCH is in the DTX mode, a reverse link power control is performed on the SCH based on the reverse pilot channel. On the other hand, in the case of forward power control, the BTS extracts PCBs from the reverse pilot channel and performs an inner fast power control only when FPC_MODE=001 or 010 in the reverse SCH message shown in FIG. 10. In step 106-3, the BTS transmits the IS-2000 reverse SCH message without any data to the BSC-SDU since the 20-ms frame received from the MS has no data.

FIGS. 4A and 4B are flowcharts illustrating a conventional forward SCH message transmitting operation. In this operation, the BSC-SDU transmits a forward SCH message to the BTS in every predetermined period (20 ms). It is to be noted in the following description that a forward/reverse SCH message is constructed in the same format as an FCH shown in FIGS. 7 to 10.

Referring to FIG. 4A, the BSC-SDU determines whether it has secured forward radio resources related with the MS and acquired the MS in step 201. If it has not, the BSC-SDU considers that it tries to synchronize with the MS and sets Frame Content in an IS-2000 forward SCH message of FIG. 8 to an idle frame to synchronize with the BTS in step 203. Since the BSC-SDU is being synchronized with the BTS, it sets power control information in the forward SCH message that will be transmitted to the BTS to appropriate values in step 206. Here, forward power control information (FPC: gain ratio) in the forward SCH message is set to an initial value for control of the MS and reverse power control information is internally set to a value identical to or proportional to Reverse: outer loop threshold (OLT) of a forward FCH/DCCH referring to power control information (FQI and Reverse Link Quality) included in a reverse SCH message received every 20 ms from the BTS. When necessary, reverse power control is performed based on Reverse: OLT of the forward FCH/DCCH. In step 207, the BSC-SDU transmits the forward SCH message with the set power control information to the BTS. Here, no data is loaded in the forward SCH message.

On the other hand, if the BSC-SDU has secured the radio resources related with the MS and acquired the MS in step 201, it checks whether there is data to be transmitted to the MS in the BSC or an external network element (e.g., PDSN(Packet Data Serving Node) or whether a DTX mode should be set on the forward link due to a bad SNR (signal-to-noise ratio) of a reverse pilot in step 202. If there is no data to transmit to the MS, the BSC-SDU goes to step 203-1 and if there exists data to transmit to the MS, it goes to step 203-2.

In step 203-1, the BSC-SDU sets Frame Content of the forward SCH message to a null frame. The BSC-SDU checks whether Frame Content of the latest reverse SCH frame received from the BTS indicates one of a null frame and an idle frame in step 204A. If it is neither a null frame nor an idle frame, the BSC-SDU checks whether Frame Content of the latest reverse SCH message indicates an erasure frame in step 205A. If it does not indicate an erasure frame, the BSC-SDU internally sets reverse power control information (Reverse: OLT) based on power control information (FQI and Reverse Link Quality) included in the reverse SCH message received from the BTS every 20 ms in step 206-1A. Since there is no forward control information in the reverse SCH message, a forward power control parameter, FPC: GR (Gain Ratio) is set based on FPC:SNR (Signal to Noise Ratio) included in a reverse FCH/SCH message. Since there is no data to transmit to the MS, the BSC-SDU loads no data in the forward SCH message and transmits it to the BTS in step 207-1.

If Frame Content of the latest reverse SCH message indicates an erasure frame in step 205A, the BSC-SDU sets a reverse power control information value to indicate power-up on a reverse link in the forward SCH message in step 206-2A. Since there exists no data to transmit to the MS, the BSC-SDU transmits the forward SCH frame without any data to the BTS in step 207-1.

If Frame Content of the latest reverse SCH message indicates one of a null frame and an idle frame in step 204A, the BSC-SDU maintains the power control information included in the reverse SCH message received from the BTS every 20 ms. The power control information is maintained until an erasure frame or a data frame is received from the BTS. That is, the BSC-SDU internally sets reverse power control information value to the previous value or to a value proportional to Reverse: OLT of the forward FCH/DCCH and a forward power control parameter, FPC: GR based on FPC: SNR of the reverse FCH/DCH in step 206-3A. Since there exists no data to transmit to the MS, the BSC-SDU transmits the forward SCH frame without any data to the BTS in step 207-1.

If there exists data to transmit to the MS in step 202, the BSC-SDU sets Frame Content of the forward SCH to a data frame in step 203-2 of FIG. 4B. Then, steps 204B to 206-3B are performed in the same manner as steps 204A to 206-3A.

In step 204B, the BSC-SDU checks whether Frame Content of the latest reverse SCH message is one of a null frame and an idle frame. If it is neither a null frame nor an idle frame, the BSC-SDU checks whether Frame Content of the latest reverse SCH message indicates an erasure frame in step 205B. If it does not indicate an erasure frame either, it sets the power control information in the forward SCH message based on power control information included in the reverse SCH message received from the BTS in step 206-1B. Since there is data to transmit to the MS, the BSC-SDU transmits the forward SCH message with the data to the BTS in step 207-2.

If the Frame Content of the latest reverse SCH message indicates an erasure frame in step 205B, the BSC-SDU sets the reverse power control information value to indicate power-up on the reverse link in the forward SCH message in step 206-2B. Since there is data to transmit to the MS, the BSC-SDU transmits the forward SCH frame with the data to the BTS in step 207-2.

If Frame Content of the latest reverse SCH message indicates one of a null frame and an idle frame in step 204B, the BSC-SDU maintains the power control information included in the reverse SCH message received from the BTS every 20 ms. The power control information is maintained until an erasure frame or a data frame is received from the BTS. That is, the BSC-SDU sets the power control information of the forward SCH message to the previous values in step 206-3B. Since there is data to transmit to the MS, the BSC-SDU transmits the forward SCH frame with the data to the BTS in step 207-2.

FIG. 5 is a flowchart illustrating a conventional reverse SCH message receiving operation. In this operation, the BSC-SDU receives and processes a reverse SCH message in every predetermined period (e.g., 20 ms) from the BTS.

Referring to FIG. 5, the BSC-SDU receives a reverse SCH message from the BTS every 20 ms in step 300. The BSC-SDU determines whether Frame Content of the received message indicates an erasure frame in step 301. If the received frame is an erasure frame, the BSC-SDU goes to step 304 and otherwise, it goes to step 302. In the case of an erasure frame, this implies that a frame received at the BTS from the MS is bad. Therefore, the BSC-SDU neglects all information in the received reverse SCH message and generates a forward SCH message indicating reverse power-up in step 304.

If the received reverse SCH frame is not an erasure frame in step 301, the BSC-SDU determines whether Frame Content of the received frame indicates an idle frame in step 302. In the case of an idle frame, the BSC-SDU neglects all information of the received reverse SCH message and generates a forward SCH message with reverse power control information maintained at an initial value, considering that the BTS has not recognized the radio resources related with the MS or has not assigned the radio resources, and with FPC: GR based on the energy of the reverse pilot channel in step 304-1.

If the received reverse SCH message is not an idle frame in step 302, the BSC-SDU determines whether its Frame Content indicates a null frame in step 303. In the case of a null frame, the BSC-SDU neglects all information of the received reverse SCH message and generates a forward SCH message with reverse power control information maintained at a value set just before a DTX mode is recognized, considering that a reverse channel between the MS and the BTS is in the DTX mode in step 304-2. The BSC-SDU also sets FPC: GR based on the energy of the reverse pilot channel because the reverse SCH message has no forward power control information. That is, the BSC-SDU neglects the power control information of the reverse SCH message and sets power control information before the DTX detection as reverse power control information for the MS in step 304-2.

If the reverse SCH message is not a null frame in step 303, which implies that it is a data frame, the BSC-SDU transmits data included in Reverse Link Information of the reverse SCH message to a corresponding data processing device (not shown) according to the type of the data and adjusts Reverse: OLT of the forward FCH/DCCH message referring to the reverse power control information. The BSC-SDU also sets FPC: GR based on the energy of the reverse pilot channel because the reverse SCH message has no forward power control information. That is, the BSC-SDU determines reverse power control information for the MS by analyzing the power control information of the reverse SCH message in step 304-3.

FIG. 6 is a flowchart illustrating a conventional forward SCH message receiving operation. In this operation, the BTS receives and processes a forward SCH message in every predetermined period (e.g., 20 ms) from the BSC-SDU.

Referring to FIG. 6, the BTS receives a forward SCH message from the BSC every 20 ms in step 400. The BTS determines whether Frame Content of the received message indicates an idle frame in step 401. In the case of an idle frame, the BTS analyses all information of the received forward SCH message, uses the reverse power control information of the forward FCH/DCCH message as reverse power control information, and uses the forward power control information of the forward SCH message as forward power control information in step 403.

If the forward SCH message is not an idle frame in step 401, the BTS determines whether Frame Content of the forward SCH message indicates a null frame in step 402. In the case of a null frame, the BTS analyses all information of the received forward SCH message and transmits the reverse power control information of the forward FCH/DCCH message as reverse power control information and the forward power control information of the forward SCH message as forward power control information to a power control processor (not shown) in step 403-1. Here, the forward power control information is maintained at the value set before the null frame is received or adjusted to a value identical to or proportional to FPC: GR of the FCH/DCCH.

If the forward SCH message is not a null frame in step 402, which implies that it is a data frame, the BTS analyses all information of the received forward SCH message and transmits the reverse power control information of the forward FCH/DCCH message as reverse power control information and the forward power control information of the forward SCH message as forward power control information to the power control processor in step 403-2.

FIG. 7 illustrates the structure of a message transmitted from the BSC to the BTS on a user traffic sub-channel of an FCH. The message is used to transmit a forward traffic channel frame directed to the MS. This message can be transmitted between a BTS and a BSC in the same BS or between a BTS and a BSC in different BSs although the message is differently called according to the interfaces. For example, the message is called "Abis SCH Forward" in the former case and "A3 SCH Forward" in the latter case. The symbols shown therein are well known to those skilled in the art.

FIG. 8 illustrates an example information element, Forward Layer 3 SCH Data representing control information for a forward CDMA traffic channel frame and a packet directed from an SDU to a target BTS. The symbols shown therein are well known to those skilled in the art.

FIG. 9 illustrates a message transmitted from the BTS to the BSC on a user traffic sub-channel of an FCH. This message is used for the BTS to transmit a decoded reverse traffic channel frame and control information. The message can be transmitted between a BTS and a BSC in the same BS or between a BTS and a BSC in different BSs although the message is differently called according to the interfaces. For example, the message is called "Abis SCH Reverse" in the former case and "A3 SCH Reverse" in the latter case. Again, the symbols shown therein are well known to those skilled in the art.

FIG. 10 illustrates an example Reverse Layer 3 SCH Data representing control information for a reverse CDMA traffic channel frame and a packet directed from a target BTS to an SDU. The symbols shown therein are well known to those skilled in the art.

The above-described conventional method produces the following disadvantages in a BS.

1. Dependence of power control on FCH/DCCH: Power control on an SCH is performed in proportion to power control on an FCH/DCCH or depends on the FCH/DCCH although the SCH is different from the FCH/DCCH. Since the SCH is dedicated to data traffic, its FER requirement is higher than that for the FCH/DCCH used for both signaling and user traffic. Therefore, power control on the SCH depending on the FCH/DCCH is inaccurate.

2. Impossibility of a BS checking the status of an MS during a DTX period of a forward SCH: When the SCH is set to a DTX mode; the BS cannot check the status of the MS for the DTX period. This results in inaccurate power control for the DTX period and afterwards.

3. SCH slow power control and DCCH slow/fast power control when a forward SCH is established: Slow power control is not supported on the forward SCH in the conventional technology. The SCH power control is proportional to the FCH/DCCH power control or depends on the FCH/DCCH power control. There exists a need for defining a forward power control mode for the forward SCH slow power control and a method of supporting DCCH slow/fast power control.

SUMMARY OF THE INVENTION

It is, therefore, an object of the present invention to provide a method for effectively supporting power control on a forward/reverse SCH for a DTX mode period in a CDMA mobile communication system.

It is another object of the present invention to provide a method for performing forward power control on an SCH independently of an FCH/DCCH in a CDMA mobile communication system.

It is a further object of the present invention to provide a method for performing slow power control on an SCH along with fast/slow power control on a DCCH in a CDMA mobile communication system.

The foregoing and other objects are achieved by a method of transmitting power control information to a BSC in a BTS of a mobile communication system. The BTS receives forward power control mode information indicating a slow power control from the BSC and transmits the FPC mode information to an MS. The BTS extracts an EIB (Erasure Indicator Bit) that is a power control command in a frame period from a reverse pilot channel received from the MS according to the FPC mode information, determines the status of the EIB, and transmits a reverse SCH message including the EIB status information to the BSC.

BRIEF DESCRIPTION OF THE DRAWINGS

The above and other objects, features and advantages of the present invention will become more apparent from the following detailed description when taken in conjunction with the accompanying drawings in which:

FIG. 5 is a flowchart illustrating a conventional reverse SCH message reception procedure in which the BSC-SDU receives and processes a reverse SCH message from the BTS in the predetermined period;

FIG. 6 is a flowchart illustrating a conventional forward SCH message reception procedure in which the BTS receives and processes the forward SCH message from the BSC-SDU in the predetermined period;

FIG. 7 illustrates a forward SCH data frame directed from the BSC to the BTS;

FIG. 8 illustrates the structure of the forward SCH data frame directed form the BSC to the BTS in detail;

FIG. 9 illustrates a reverse SCH data frame directed from the BTS to the BSC;

FIG. 10 illustrates the structure of the reverse SCH data frame directed form the BTS to the BSC in detail;

FIG. 12 illustrates a reverse SCH data frame directed from the BTS to the BSC according to an embodiment of the present invention;

FIG. 13 illustrates the structure of the reverse SCH data frame directed from the BTS to the BSC in detail according to an embodiment of the present invention;

FIGS. 14A and 14B are flowcharts illustrating a forward SCH message transmission procedure according to an embodiment of the present invention in which the BSC-SDU transmits a forward SCH message to the BST in every predetermined period;

DETAILED DESCRIPTION OF THE PREFERRED EMBODIMENTS

A preferred embodiment of the present invention will be described hereinbelow with reference to the accompanying drawings. In the following description, well-known functions or constructions are not described in detail since they would obscure the invention in unnecessary detail.

The present invention provides a method of supporting a radio channel environment in which a large amount of data is processed in a BTS and a BSC of a CDMA mobile communication system. Particularly, the present invention provides a method of supporting forward slow power control on an SCH that transmits high rate data in a BTS and a BSC.

Figure 1:
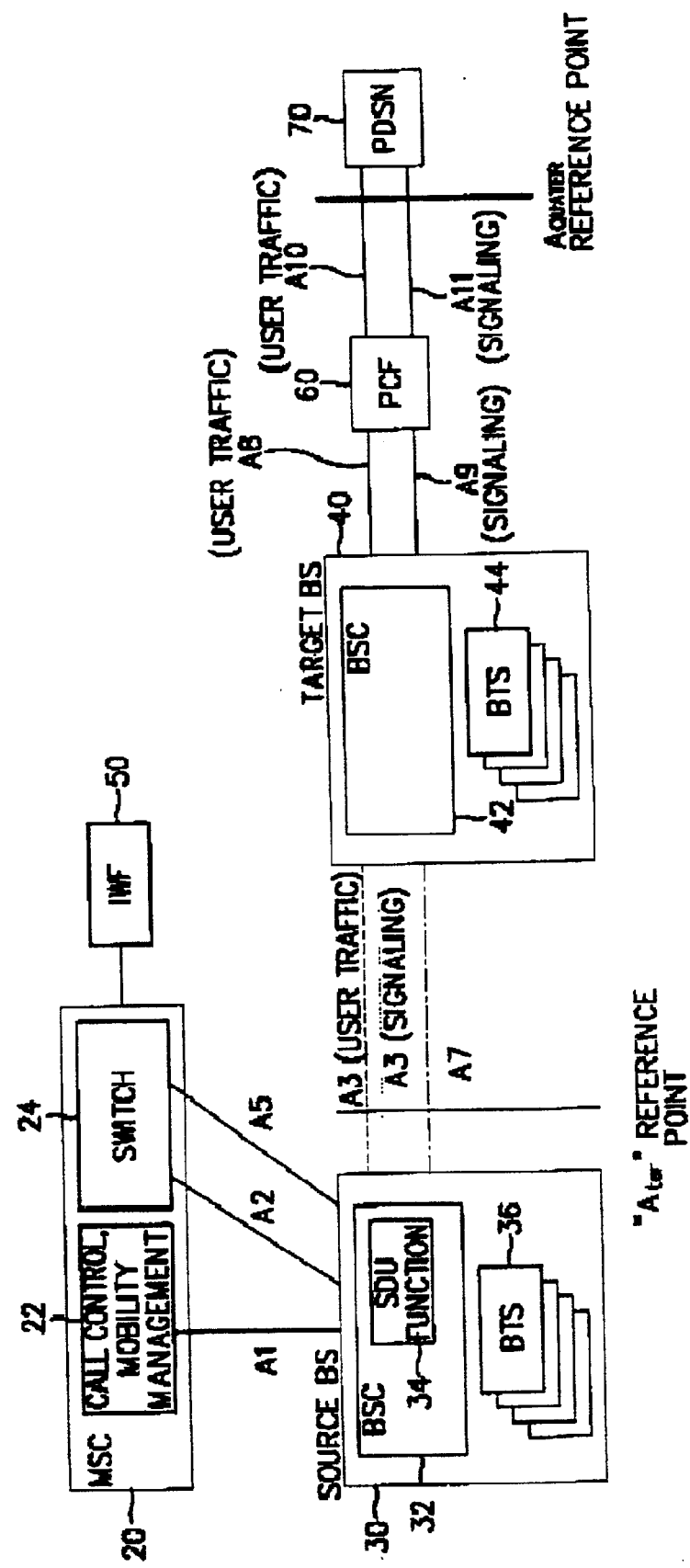
FIG. 1 illustrates a 3G IOS reference model of an MSC, BSs, and digital air interfaces between the BSs in a typical mobile communication system.
Figure 2:
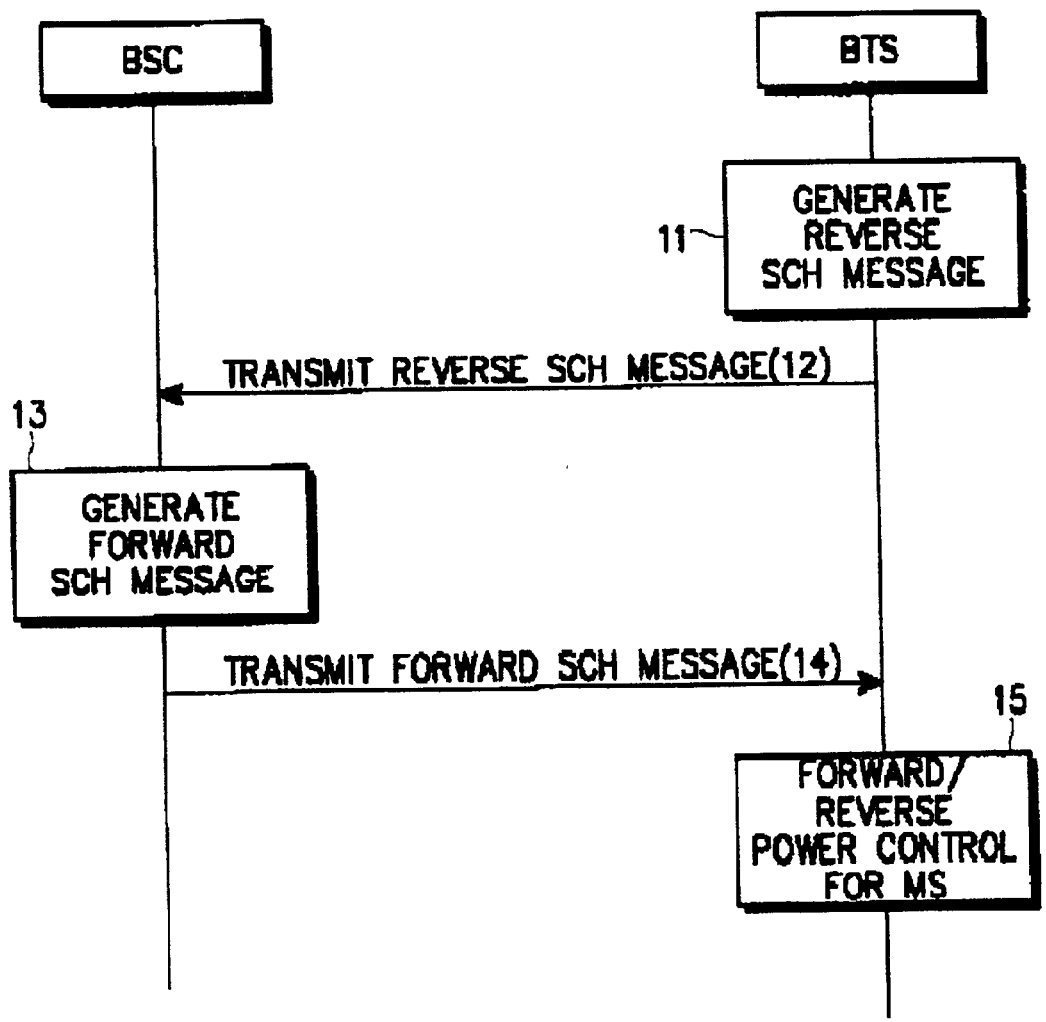
FIG. 2 is a diagram illustrating a conventional SCH signal exchange between a BTS and a BSC.
Figure 3:
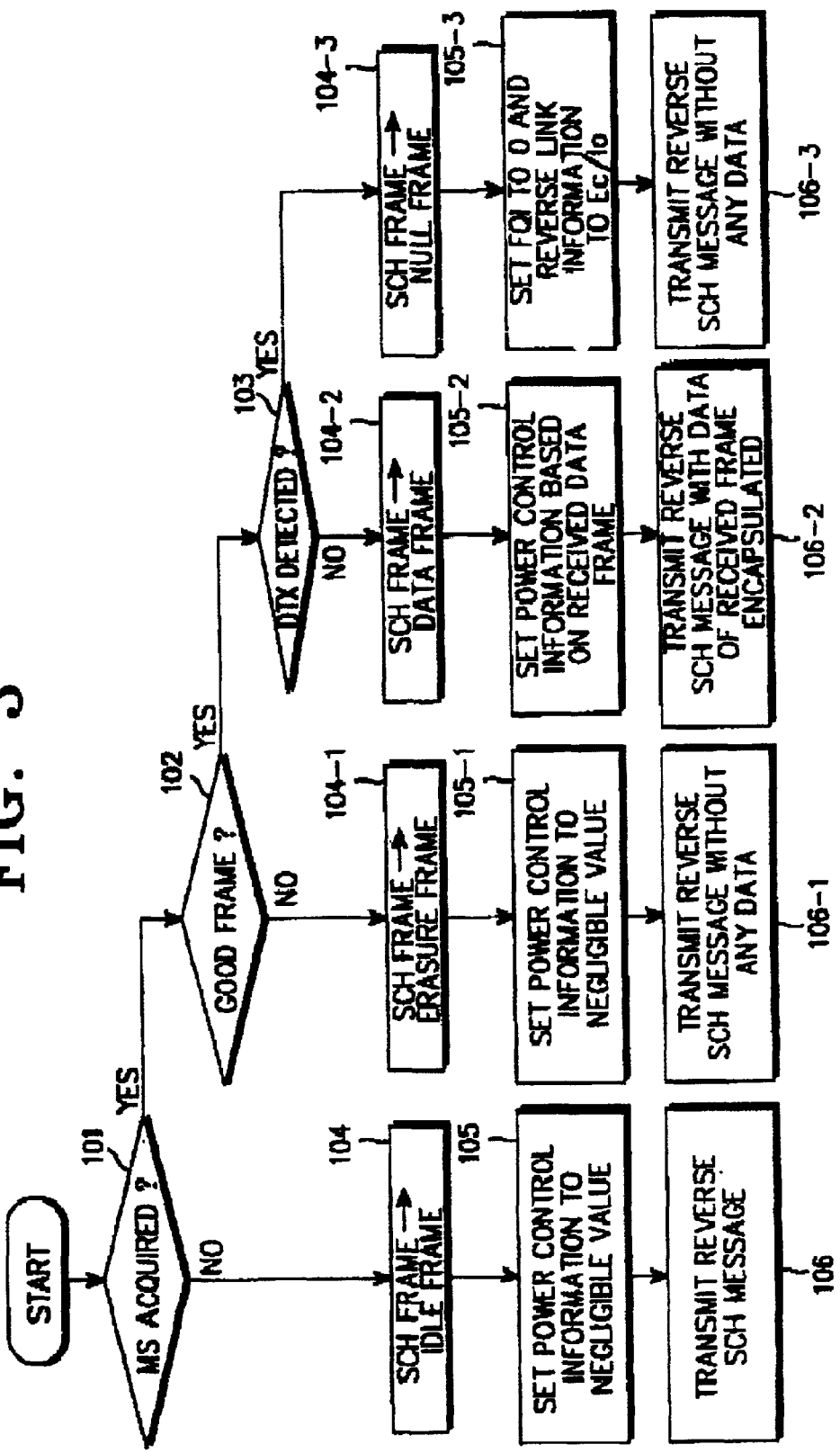
FIG. 3 is a flowchart illustrating a conventional reverse SCH message transmission procedure in which the BTS transmits a frame received from an MS in every predetermined period as a reverse SCH message to the BSC-SDU.
Figure 4A:
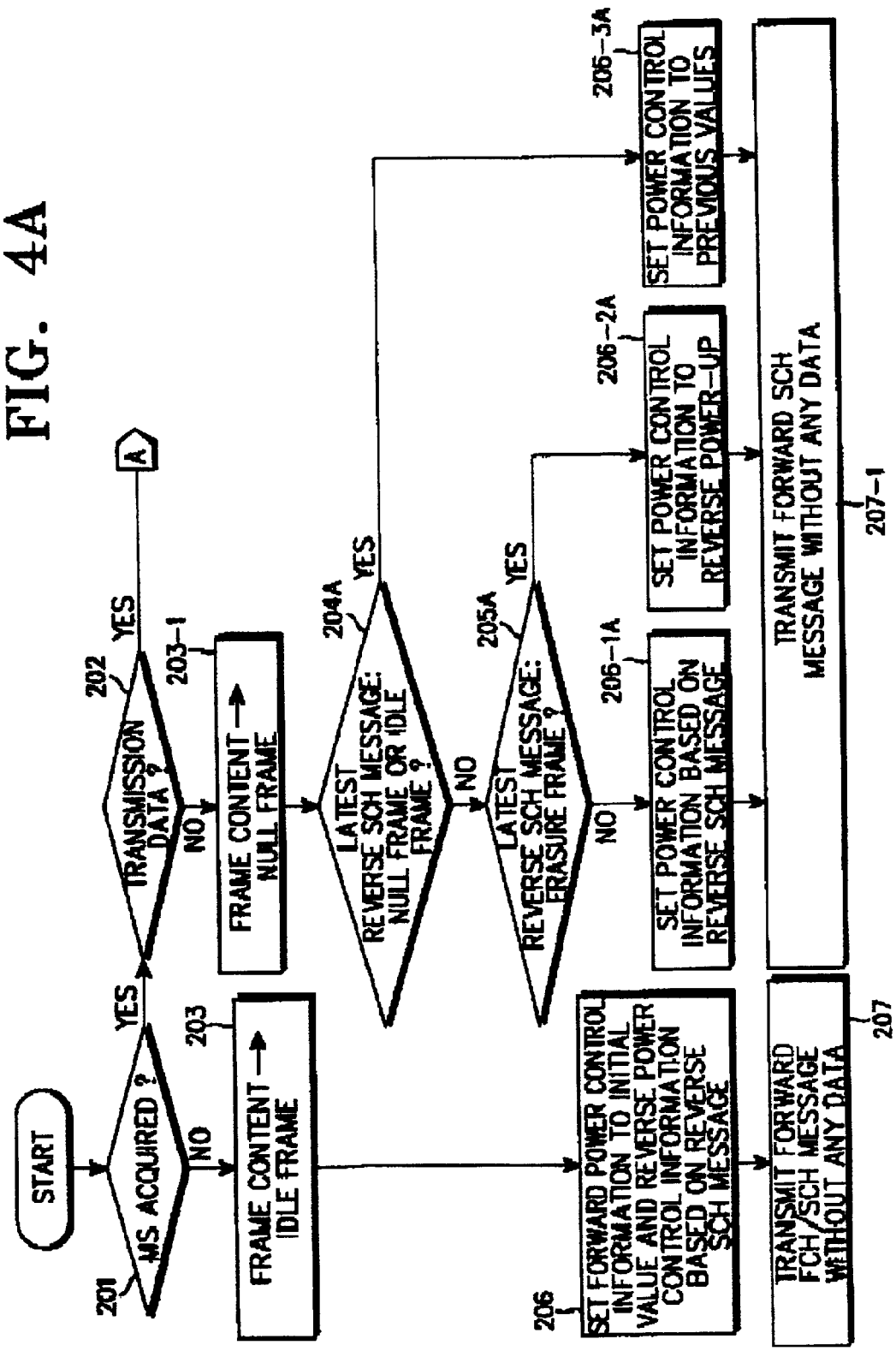
FIGS. 4A and 4B are flowcharts illustrating a conventional forward SCH message transmission procedure in which the BSC-SDU transmits a forward SCH message to the BTS in every predetermined period.
Figure 4B:
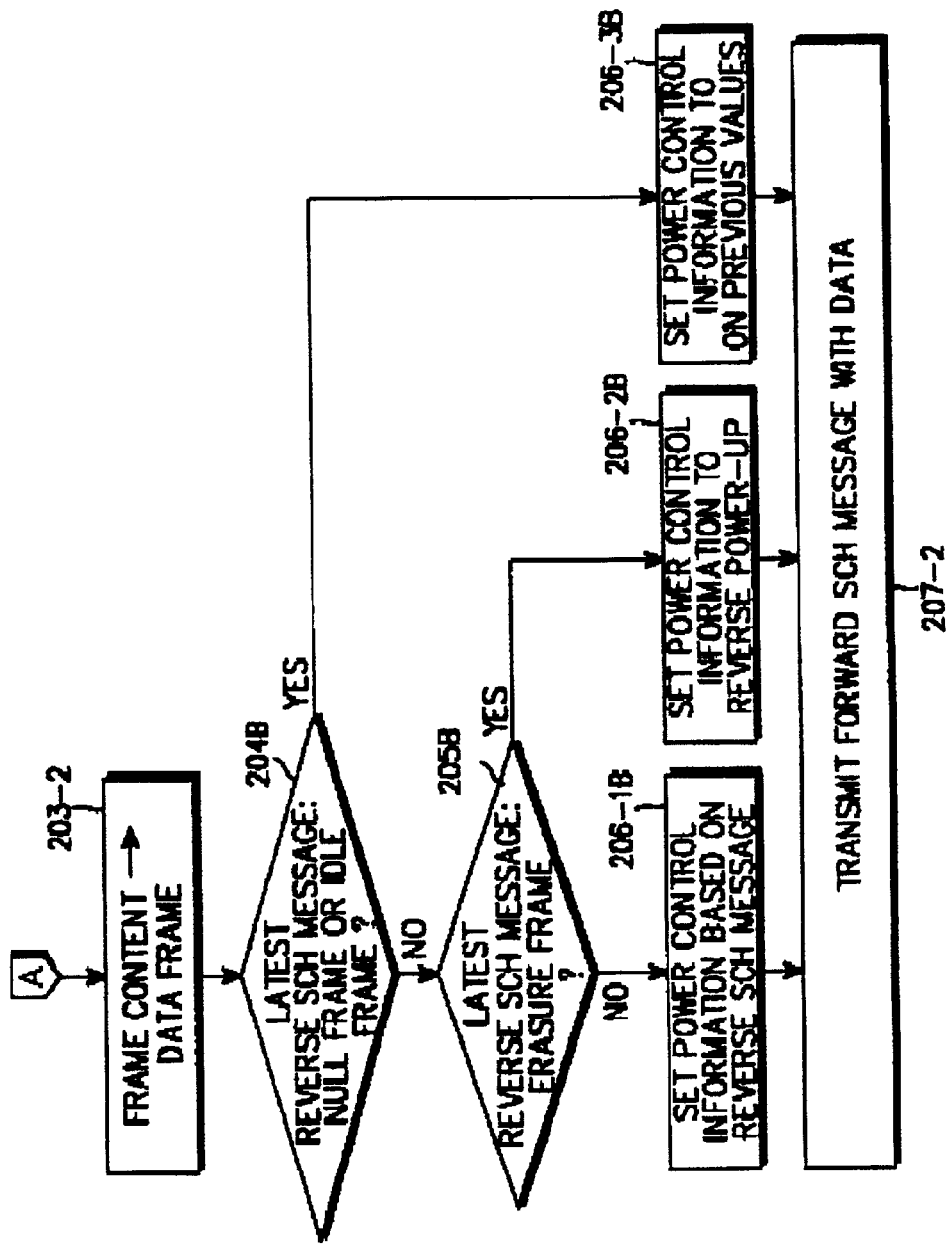
Figure 11:
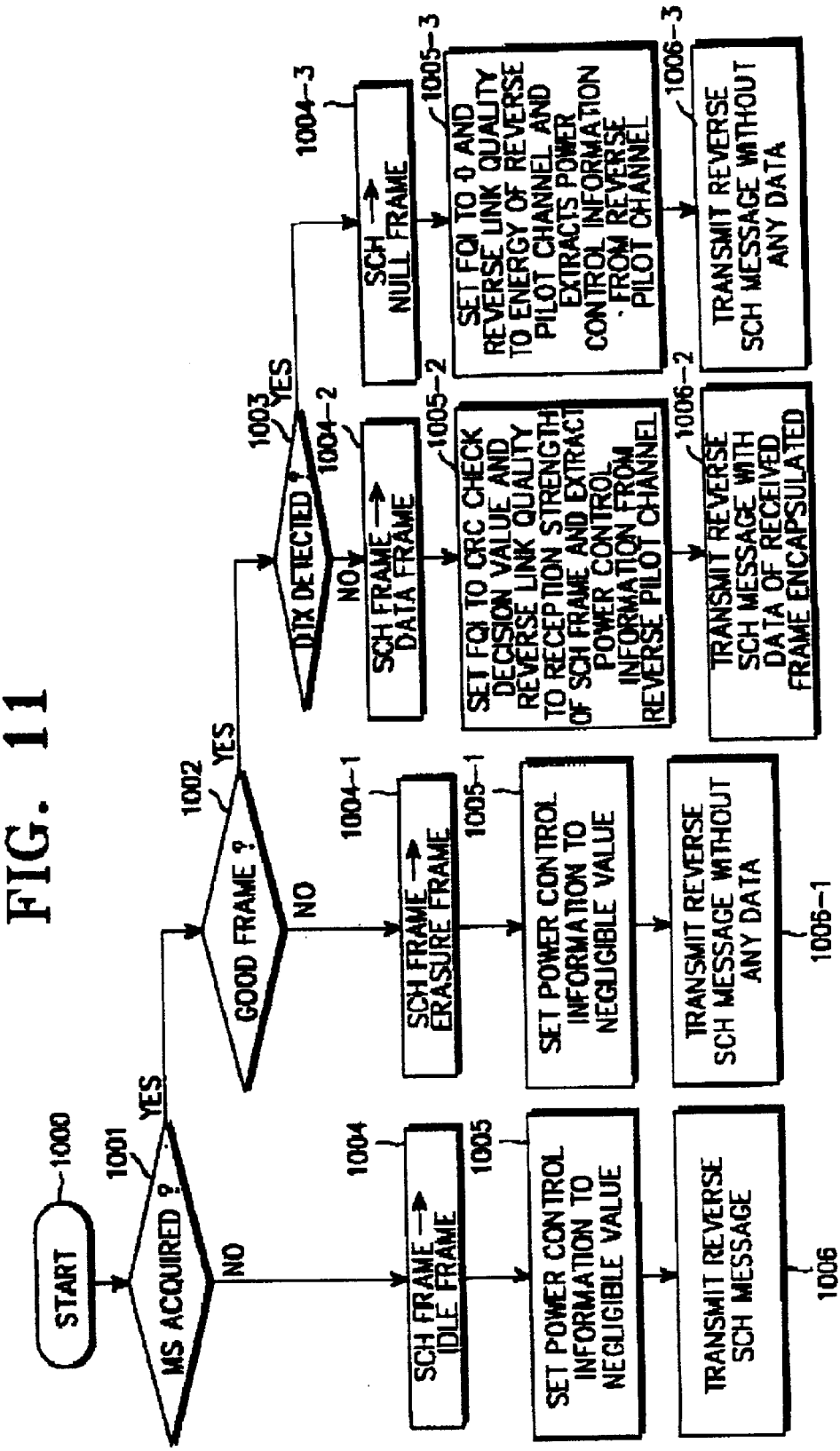
FIG. 11 is a flowchart illustrating a reverse SCH message transmission procedure according to an embodiment of the present invention, wherein the BTS transmits a frame received in every predetermined period from the MS as a reverse SCH message to the BSC-SDU.

FIG. 11 is a flowchart illustrating a reverse SCH message transmission procedure according to the present invention, wherein the BTS transmits a frame received in every predetermined period from the MS as a reverse SCH message to the BSC-SDU.

Referring to FIG. 11, the BTS determines whether it has secured radio resources related with the MS and acquired the MS in step 1001. If it has not, the BTS considers that it is being synchronized with the MS and sets Frame Content in an IS-2000 reverse SCH message shown in FIG. 12, and in detail in FIG. 13 to an idle frame to synchronize with the BSC-SDU in step 1004. The symbols shown in FIG. 12 and FIG. 13 are well known to those skilled in the art. Since the BTS is being synchronized with the BSC-SDU, it sets power control information of the reverse SCH message that will be transmitted to the BSC-SDU to negligible values in step 1005. In step 1006, the BTS transmits the IS-2000 reverse SCH message to the BSC-SDU.

On the other hand, if the BTS has secured the radio resources related with the MS and acquired the MS in step 1001, it checks the quality of a frame received from the MS in step 1002. If the data frame is bad, the BTS sets Frame Content in the reverse SCH message to an erasure frame in step 1004-1. In step 1005-1, the BTS sets the power control information of the reverse SCH message that will be transmitted to the BSC-SDU to negligible values. Since the received frame is bad, the BTS transmits the IS-2000 reverse SCH message without any data to the BSC-SDU in step 1006-1. Upon recognition of the erasure frame, the BSC-SDU will request the MS to transmit a frame with incremented power since the frame received from the MS is bad.

If the BTS determines that the received data frame is good in step 1002, it determines whether it detects a DTX mode during reception of a reverse SCH frame from the MS by a known DTX mode detection method applied to a radio period between an MS and a BTS in step 1003. If the DTX mode is detected, the BTS goes to step 1004-3 and otherwise, it goes to step 1004-2.

In step 1004-2, the BTS sets Frame Content of the reverse SCH message to a data frame. The BTS sets FQI and Reverse Link Quality of the reverse SCH message in the known manner in step 1005-2. That is, FQI is set to a CRC check result of the reverse SCH frame and Reverse Link Quality to the reception strength of the reverse SCH frame. In the case of forward power control, the BTS extracts power control information (PCB or EIB) from a reverse pilot channel according to FPC_MODE. If PCBs are received, 16 power control commands exist in a 20-ms frame. If EIBs are received, one power control command exists in a 20-ms frame. The MS transmits at least one power control command in a 20-ms frame on a reverse pilot channel according to FPC_MODE. The 20-ms frame is divided into 16 slots, one slot is called a PCG. Four PCGs are called a power control sub-channel. When FPC_MODE=001 or 010 in which the reverse pilot channel transmits PCBs, a fast power control is performed at 400 or 200 bps and EIB of the reverse SCH message is set to 0. In this case, the BSC neglects the EIB. On the other hand, when FPC_MODE=101 or 110 in which EIBs are transmitted, a slow power control is performed and EIB of the reverse SCH message is set to an EIB decision value after decoding the 20-ms frame (see FIG. 13). In step 1006-2, the BTS transmits the IS-2000 reverse SCH message shown in FIG. 13 with the data of the received 2-ms frame encapsulated to the BSC-SDU.

If the DTX mode is detected in step 1003, the BTS sets Frame Content of the reverse SCH message to a null frame in step 1004-3 of FIG. 11. In step 1005-3, in the case of reverse power control, the BTS sets FQI to 0 and Reverse Link Quality to the energy (Ec/Io) of the reverse pilot channel. That is, when the SCH is in the DTX mode, the reverse power control is performed on the SCH based on the reverse pilot channel. In the case of forward power control, the BTS extracts power control information (PCB or EIB) from the reverse pilot channel according to FPC_MODE. When FPC_MODE=001 or 010 in which the reverse pilot channel transmits PCBs, a fast power control is performed at 400 or 200 bps and EIB of the reverse SCH message is set to 0. In this case, the BSC neglects the EIB. On the other hand, when FPC_MODE=101 or 110 in which EIBs are transmitted, a slow power control is performed and EIB of the reverse SCH message is set to an EIB decision value after decoding the 20-ms frame (see FIG. 13). In step 1006-3, the BTS transmits the IS-2000 reverse SCH message shown in FIG. 13 without any data to the BSC-SDU since the received 20-ms frame has no data.

Figure 14B:
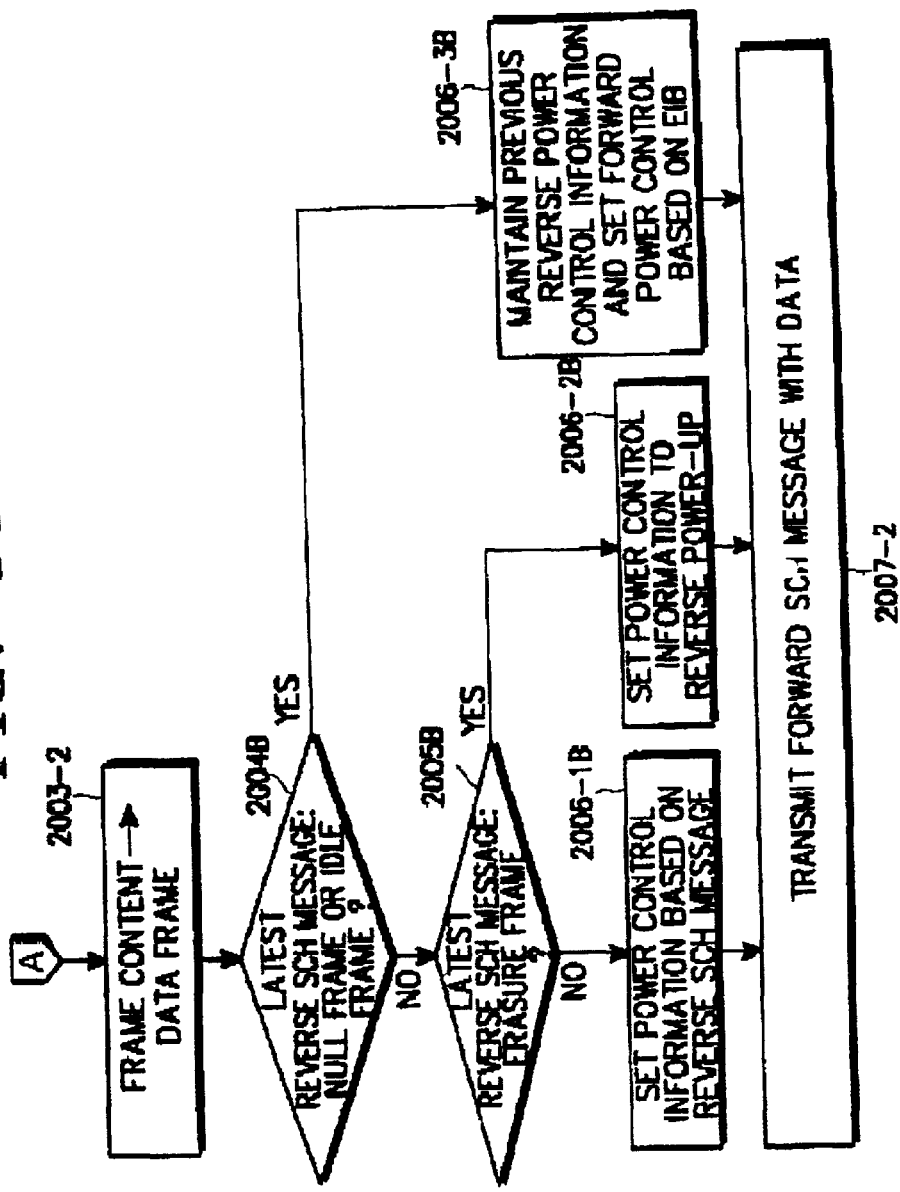

FIGS. 14A and 14B are flowcharts illustrating a forward SCH message transmitting operation according to the present invention. In this operation, the BSC-SDU transmits a forward SCH message to the BTS in every predetermined period (20 ms).

Referring to FIG. 14A, the BSC-SDU determines whether it has secured forward radio resources related with the MS and acquired the MS in step 2001. If it has not, the BSC-SDU considers that it is being synchronized with the MS and sets Frame Content of an IS-2000 forward SCH message to an idle frame to synchronize with the BTS in step 2003. Since the BSC-SDU is being synchronized with the BTS, it sets power control information of the forward SCH message to appropriate values in step 2006. Here, forward power control information can be set to an initial value for control of the MS and reverse power control information is set based on power control information included in a reverse SCH message received from the BTS every 20 ms. That is, the reverse power control information is set to a value identical to or proportional to that of an FCH/DCCH referring to the power control information (FQI and Reverse Link Quality) of the reverse SCH message. When necessary, the reverse power control information can be adjusted all together by Reverse: OLT of the forward FCH/DCCH message. In step 2007, the BSC-SDU transmits the forward SCH message with the set power control information to the BTS. Here, no data is loaded in the forward SCH message.

On the other hand, if the BSC-SDU has secured the radio resources related with the MS and acquired the MS in step 2001, it checks whether there is data to be transmitted to the MS or whether a DTX mode should be set on the forward link due to a bad SNR of the reverse pilot in step 2002. If there is no data to transmit to the MS, the BSC-SDU goes to step 2003-1 and if there exists data to transmit to the MS, it goes to step 2003-2 of FIG. 14B.

In step 2003-1, the BSC-SDU sets Frame Content of the forward SCH message to a null frame. The BSC-SDU checks whether Frame Content of the latest reverse SCH frame received from the BTS indicates one of a null frame and an idle frame in step 2004A. If it is neither a null frame nor an idle frame, the BSC-SDU checks whether Frame Content of the latest reverse SCH message indicates an erasure frame in step 2005A. If it does not indicate an erasure frame either, the BSC-SDU sets threshold for forward power control (FPC: GR) based on EIB of the reverse SCH message and internally sets reverse power control information to a value identical to or proportional to that of the FCH/DCCH referring to the power control information (FQI and Reverse Link Quality) of the reverse SCH message received from the BTS every 20 ms in step 2006-1A. When necessary, the reverse power control information is adjusted all together by Reverse: OLT of the forward FCH/DCCH. Since there is no data to transmit to the MS, the BSC-SDU loads no data in the forward SCH message and transmits it to the BTS in step 2007-1.

If the Frame Content of the latest reverse SCH message indicates an erasure frame in step 2005A, the BSC-SDU sets the reverse power control information of the forward FCH/DCCH to reverse power-up in step 2006-2A, because the forward SCH message has no fields for reverse power control such as Reverse: OLT. The BSC-SDU transmits the forward SCH frame without any data to the BTS in step 2007-1.

If Frame Content of the latest reverse SCH message indicates a null frame or an idle frame in step 2004A, the BSC-SDU maintains the previous reverse power control information until a data frame or an erasure frame is received from the BTS or sets reverse power control information to values proportional to the reverse power control information (Reverse: OLT) of the FCH/DCCH in step 2006-3A. The BSC-SDU also sets a forward power control threshold (FPC: GR) based on EIB of the reverse SCH message (see FIG. 8). The BSC-SDU transmits the forward SCH frame without any data to the BTS in step 2007-1.

If there exists data to transmit to the MS in step 2002, the BSC-SDU sets Frame Content of the forward SCH message to a data frame in step 2003-2 of FIG. 14B. Then, steps 2004B to 2006-3B are performed in the same manner as steps 2004A to 2006-3A. In step 2004B, the BSC-SDU checks whether Frame Content of the latest reverse SCH message is one of a null frame and an idle frame.

If it is neither a null frame nor an idle frame, the BSC-SDU checks whether Frame Content of the latest reverse SCH message indicates an erasure frame in step 2005B. If it does not indicate an erasure frame either, the BSC-SDU sets power control information in the forward SCH message shown in FIG. 8 based on the power control information included in the reverse SCH message received from the BTS every 20 ms in step 2006-1B. Since there exists data to transmit to the MS, the BSC-SDU transmits the forward SCH message with the data capsulated to the BTS in step 2007-2.

If the Frame Content of the latest reverse SCH message indicates an erasure frame in step 2005B, the BSC-SDU sets reverse power control information of the forward FCH/DCCH message to power-up on a reverse link in the forward SCH message in step 2006-2B. Since there exists data to transmit to the MS, the BSC-SDU transmits the forward SCH frame with the data to the BTS in step 2007-2.

If Frame Content of the latest reverse SCH message indicates a null frame or an erasure frame in step 2004B, the BSC-SDU maintains the previous reverse power control information until a data frame or an erasure frame is received from the BTS or sets reverse power control information to values proportional to the reverse power control information (Reverse: OLT) of the FCH/DCCH in step 2006-3B. The BSC-SDU also sets a forward power control threshold (FPC: GR) based on EIB of the reverse SCH message (see FIG. 8). Since there exists data to transmit to the MS, the BSC-SDU transmits the forward SCH message with the data to the BTS in step 2007-2.

Figure 15:
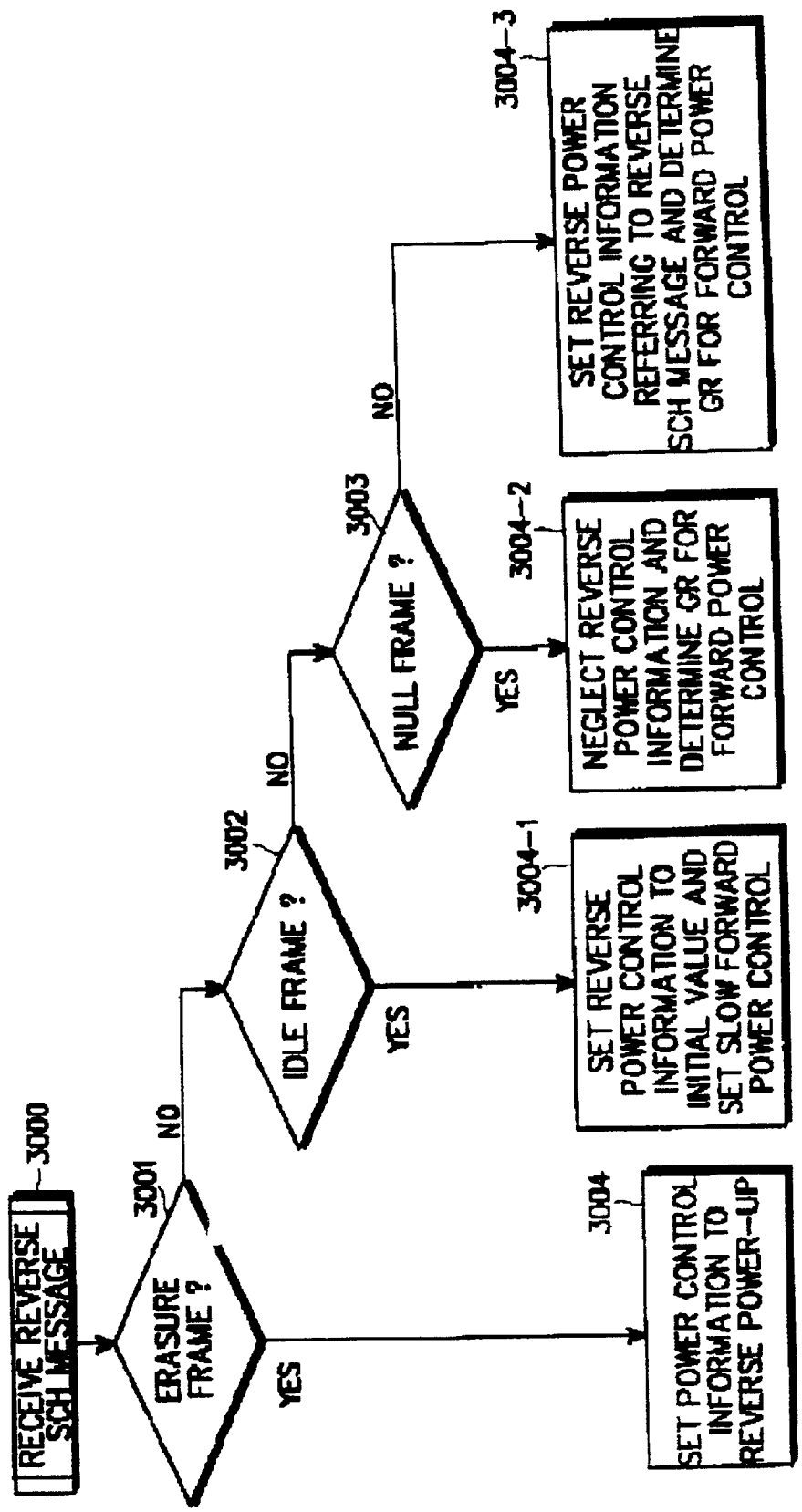
FIG. 15 is a flowchart illustrating a reverse SCH message reception procedure according to an embodiment of the present invention in which the BSC-SDU receives and processes a reverse SCH message from the BST in the predetermined period.

FIG. 15 is a flowchart illustrating a reverse SCH message receiving operation according to the present invention. In this operation, the BSC-SDU receives and processes a reverse SCH message received in every predetermined period (e.g., 20 ms) from the BTS.

Referring to FIG. 15, the BSC-SDU receives a reverse SCH message from the BTS every 20 ms in step 3000. The BSC-SDU determines whether Frame Content of the received message indicates an erasure frame in step 3001. If the received frame is an erasure frame, the BSC-SDU goes to step 3004 and otherwise, it goes to step 3002. In the case of an erasure frame, it implies that a frame received at the BTS from the MS is bad. Therefore, the BSC-SDU neglects all information in the received reverse SCH message and sets Reverse: OLT of the forward FCH/DCCH message to reverse power-up in step 3004.

If the received reverse SCH frame is not an erasure frame in step 3001, the BSC-SDU determines whether Frame Content of the received frame indicates an idle frame in step 3002. In the case of an idle frame, the BSC-SDU uses an initial value set in Reverse: OLT of the FCH/DCCH message as reverse power control information of the MS, considering that the BTS has not recognized the radio resources related with the MS or has not assigned the radio resources in step 3004-1. The BSC-SDU also sets forward power control information requesting a slow power control based on EIB of the reverse SCH message in the forward SCH message and then sets FPC: GR.

If the received frame is not an idle frame in step 3002, the BSC-SDU checks whether its Frame Content indicates a null frame in step 3003. If the received frame is not a null frame in step 3003, the BSC-SDU neglects all information of the reverse SCH message or refers to the reverse power control information of the existing FCH/DCCH message in step 3004-2. For slow forward power control, the BSC-SDU checks whether the previous forward frame has errors by reading EIB of the reverse SCH message and determines a forward power control threshold (gain ratio).

If the received frame is not a null frame in step 3003, which implies that it is a data frame, the BSC-SDU transmits data of Reverse Link Information included in the reverse SCH message to a corresponding data processor according to the type of the data and adjusts reverse power control information for the MS via Reverse: OLT of the forward FCH/DCCH message by analyzing all power control information of the reverse SCH message in step 3004-3. The BSC-SDU also determines whether the previous forward frame has errors by reading EIB of the reverse SCH message and determines a forward power control threshold (gain ratio).

Figure 16:
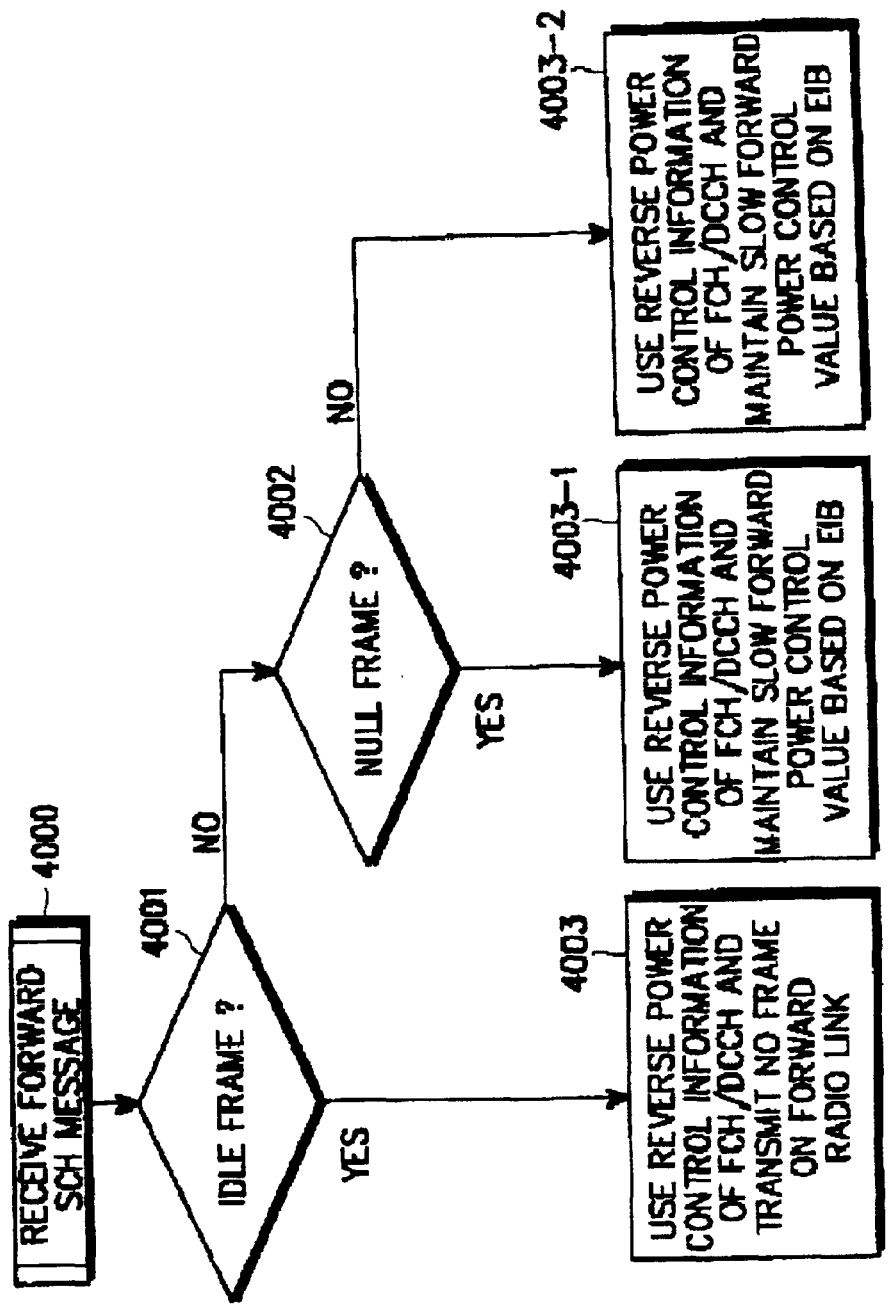
FIG. 16 is a flowchart illustrating a forward SCH message reception procedure according to an embodiment of the present invention in which the BTS receives and processes the forward SCH message from the BSC-SDU in the predetermined period.

FIG. 16 is a flowchart illustrating a forward SCH message receiving operation according to the present invention. In this operation, the BTS receives and processes a forward SCH message in every predetermined period (e.g., 20 ms) from the BSC-SDU.

Referring to FIG. 16, the BTS receives a forward SCH message from the BSC every 20 ms in step 4000. The BTS determines whether Frame Content of the received message indicates an idle frame in step 4001. In the case of an idle frame, the BTS analyses all information of the received forward SCH message and transmits the reverse power control information of the FCH/DCCH as reverse power control information and the forward power control information of the forward SCH message as forward power control information to a power control processor (not shown) in step 4003. Here, no frames are transmitted on a forward radio link.

If the received frame is not an idle frame in step 4001, the BTS determines whether Frame Content of the received frame indicates a null frame in step 4002. In the case of a null frame, the BTS analyses all information of the received forward SCH message and transmits the reverse power control information of the FCH/DCCH as reverse power control information for the MS and forward slow power control values based on EIB as forward power control information to the power control processor for the DTX period as for the non-DTX period in step 4003-1.

If the received frame is not a null frame in step 4002, which implies that it is a data frame, the BTS analyses all information of the received forward SCH message and transmits the reverse power control information of the FCH/DCCH as reverse power control information for the MS and forward slow power control values based on EIB as forward power control information to the power control processor in step 4003-2. Here, an SCH data frame is transmitted on the forward radio link.

Figure 17:
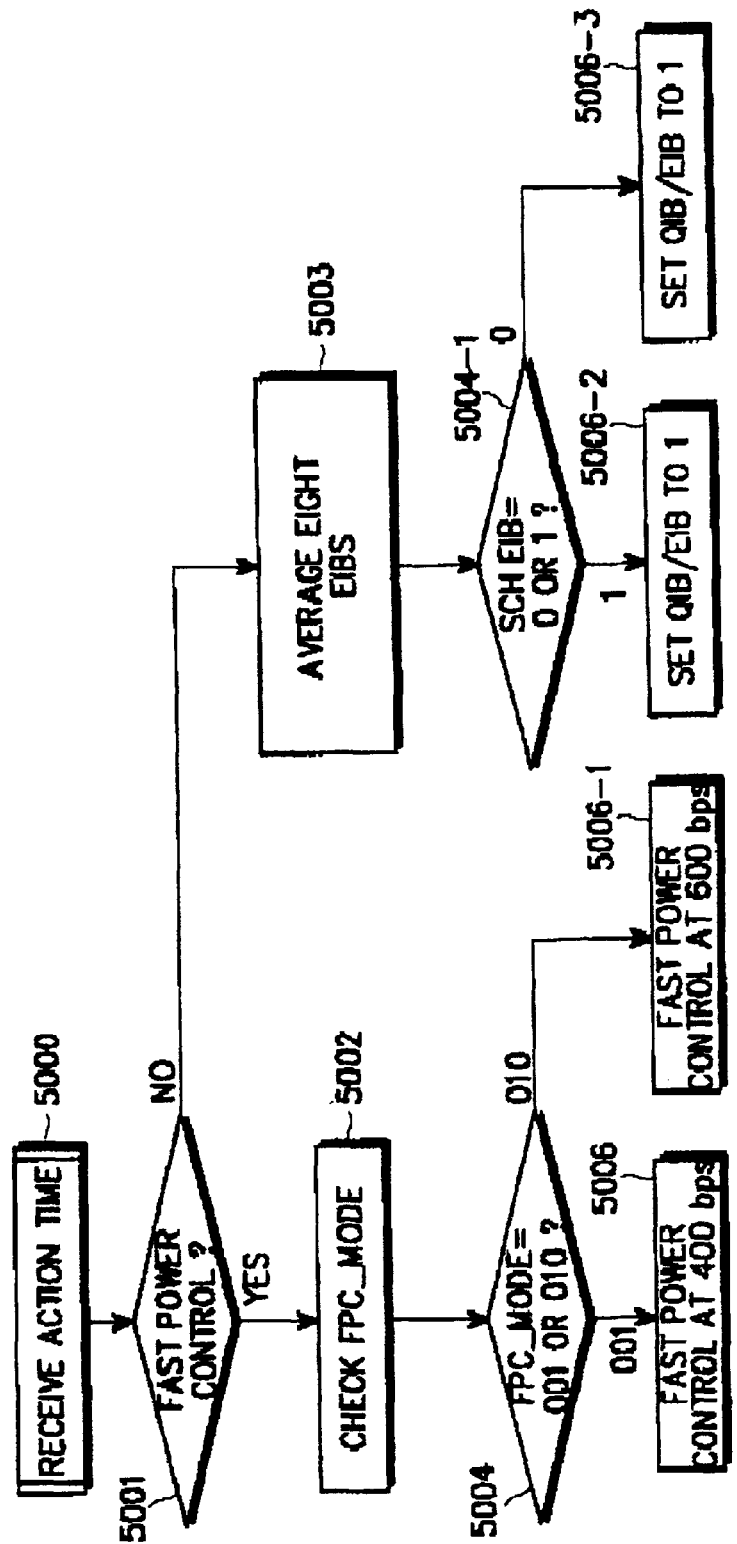
FIG. 17 is a flowchart illustrating an operation for forward SCH fast/slow power control based on a PCG (Power Control Group), that is, PCBs (Power Control Bits) or EIBs (Erasure Indicator Bits) of a reverse pilot channel received from the MS in the BTS according to an embodiment of the present invention.

FIG. 17 is a flowchart illustrating an operation for forward SCH fast/slow power control based on a PCG (PCB or EIB) of a reverse pilot channel in the BS according to the present invention.

Referring to FIG. 17, the BTS receives a signal indicating the action time of FPC_MODE from the BSC in step 5000 and determines whether FPC_MODE indicates a fast power control (0) or a slow power control (1) in step 5001. In the case of the fast power control, the BTS checks FPC_MODE in step 5002. Then, the BTS determines whether FPC_MODE is 001 or 010 in step 5004. If FPC_MODE is 001, the BTS performs a forward SCH fast power control at 400 bps in step 5006. If FPC_MODE is 010, the BTS performed a forward SCH fast power control at 600 bps in step 5006-1.

In the case of the slow power control, the BTS decodes EIBs of odd-numbered SCHs in PCGs of a power control sub-channel of a reverse pilot channel in every 2.5-ms periods and takes an average of eight values in step 5003 and determines whether the average is 0 or 1 in step 5004-1. If the EIB decision value is 1, the BTS QIB/EIB of the reverse SCH message to 1 in step 5006-2. If the EIB decision value is 0, the BTS sets QIB/EIB of the reverse SCH message to 0 in step 5006-3.

Table 1 shown below lists transmission rates versus FPC modes. Here, a slow power control is performed at a data rate of 50 bps and a fast power control, at a data rate higher than 50 bps. The slow forward power control on an SCH is performed when FPC_MODE is 101 or 110. If this slow forward power control mode is set, an MS transmits an EIB on a reverse pilot channel in a 20-ms frame and a BS (a BTS and a BSC) determines a threshold for the forward power control (FPC: GR) based on the EIB. As shown in Table 1, fast/slow power control can be performed on an FCH/DCCH while the forward SCH slow power control is being performed according to the forward power control mode.

TABLE 1

| FPC_MODE | Primary (FCH, SCH) power control | Secondary (SCH) power control |
|---|---|---|
| 000 | 800 bps | Not supported |
| 001 | 400 bps | 400 bps |
| 010 | 200 bps | 600 bps |
| 011 | 50 bps | Not supported |
| 100 | 50 bps | Not supported |
| 101 | 50 bps | 50 bps |
| 110 | 400 bps | 50 bps |

In accordance with the present invention as described above, forward power control can be performed on an SCH independently of an FCH/DCCH. The status of an MS can be ascertained for a DTX mode period of the SCH. Furthermore, when the SCH is established, a fast power control at 400/200 bps and a slow power control at 50 bps on the FCH/DCCH can be performed while an independent slow power control at 50 bps and a fast power control at 400/600 bps on the SCH is being performed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting power control information to a BSC (Base Station Controller) in a BTS (Base station Transceiver System) of a mobile communication system, comprising the steps of:

receiving forward power control (FPC) mode information indicating a slow power control from the BSC and transmitting the FPC mode information to an MS (Mobile Station);

extracting an EIB (Erasure Indicator Bit) that is a power control command in a frame period from a reverse pilot channel received from the MS according to the FPC mode information;

determining the status of the EIB; and transmitting a reverse SCH (Supplemental Channel) message including the EIB status information to the BSC.

2. The method of claim 1, further comprising the steps of determining a threshold for a forward SCH (Supplemental Channel) power control based on the EIB status included in the reverse SCH message in the BSC.

3. The method of claim 1, wherein the EIB status is determined using eight odd-numbered PCBs (Power Control Bits) in a PCG (Power Control Group) of the reverse pilot channel.

4. A method of transmitting a signal to a BSC (Base Station Controller) in a BTS (Base Station Transceiver System) of a mobile communication system, comprising the steps of:

checking a forward power control mode (FPC_MODE);

receiving an EIB (Erasure Indicator Bit) on a reverse pilot channel from an MS (Mobile Station) when the forward power control mode indicates a slow power control; and transmitting a reverse SCH (Supplemental Channel) message including the received EIB to the BSC.

5. The method of claim 4, further comprising the step of performing a fast power control on a forward SCH based on a plurality of PCBs (Power Control Bits) received for one frame period on the reverse pilot channel from the MS if the forward power control mode indicates a fast power control.

6. A method of transmitting power control information to a BTS (Base Station Transceiver System) in a BSC (Base Station Controller) of a mobile communication system, comprising the steps of:

receiving a reverse SCH (Supplemental Channel) frame and a reverse SCH message including power control information from the BTS;

extracting an EIB (Erasure Indicator Bit) that is a power control command in a frame period from the reverse SCH message;

determining a forward power control threshold based on the EIB;

extracting information about the quality of a reverse SCH frame from the reverse SCH message; and changing a reverse power control threshold in a forward SCH(Supnlemental Channel) message directed to the BTS based on the extracted quality information when reverse power control information should be adjusted; and transmitting a forward SCH message including the threshold to the BTS.

7. A method of controlling the power of forward channels transmitted from a BTS (Base Station Transceiver System) to an MS (Mobile Station) in a mobile communication system, comprising the steps of:

determining power control rates for a forward FCH (Fundamental Channel)/DCCH (Dedicated Control Channel) and a forward SCH (Supplemental Channel);

performing a fast power control on the FCH(Fundamental Channel)/DCCH at the determined power control rate according to a plurality of power control commands received for one frame period from the MS; and performing a slow power control on the SCH at the determined power control rate according to a power control command received for one frame period from the MS.

8. The method of claim 7, wherein a forward power control threshold is changed according to the power control command received for one frame period in the slow power control.

9. The method of claim 7, wherein the transmission power of the SCH is increased or decreased by a predetermined power value according to the plurality of power control commands received for one frame period in the fast power control.

10. A method of controlling the power of forward channels transmitted from a BTS (Base Station Transceiver System) to an MS (Mobile Station) in a mobile communication system, comprising the steps of:

determining power control rates for a forward FCH (Fundamental Channel)/DCCH (Dedicated Control Channel) and a forward SCH (Supplemental Channel);

performing a slow power control on the FCH/DCCH at the determined power control rate according to a power control command received for one frame period from the MS; and performing a fast power control on the SCH at the determined power control rate according to a plurality of power control commands received for one frame period from the MS.

11. The method of claim 10, wherein a forward power control threshold is changed according to the power control command received for one frame period in the slow power control.

12. A method of transmitting power control information to a BSC (Base Station Controller) in a BTS (Base station Transceiver System) of a mobile communication system, comprising the steps of:

detecting a discontinuous transmission (DTX) period by measuring the energy of a supplemental channel (SCH) frame received from a mobile station (MS);

checking a forward power control mode (FPC_MODE) if the DTX period is detected;

extracting a power control command from a reverse pilot channel according to the forward power control mode;

performing a fast power control on a forward SCH according to a power control bit (PCB) if the power control command is the PCB; and transmitting a reverse SCH message including an erasure indicator bit (EIB) status value to the BSC if the power control command is an EIB.

* * * * *